United States Patent [19]

Bauer

[11] Patent Number: 5,793,934
[45] Date of Patent: Aug. 11, 1998

[54] METHOD FOR THE ORIENTATION, ROUTE PLANNING AND CONTROL OF AN AUTONOMOUS MOBILE UNIT

[75] Inventor: Rudolf Bauer, Neubiberg, Germany

[73] Assignee: Siemens Aktiengesellschaft, Germany

[21] Appl. No.: 750,883

[22] PCT Filed: Jun. 6, 1995

[86] PCT No.: PCT/DE95/00734

§ 371 Date: Dec. 17, 1996

§ 102(e) Date: Dec. 17, 1996

[87] PCT Pub. No.: WO95/35531

PCT Pub. Date: Dec. 28, 1995

[30] Foreign Application Priority Data

Jun. 22, 1994 [DE] Germany .................. 44 21 805.2
Oct. 12, 1994 [DE] Germany .................. 44 36 477.6

[51] Int. Cl.$^6$ ........................................... G05B 19/04
[52] U.S. Cl. ................................................... 395/85
[58] Field of Search .................... 318/587, 568.12; 364/424.027, 424.029, 424.031, 424.032, 461; 395/85, 90, 94; 901/1

[56] References Cited

U.S. PATENT DOCUMENTS

| | | | |
|---|---|---|---|
| 5,001,635 | 3/1991 | Yasutomi et al. | 364/424.027 |
| 5,006,988 | 4/1991 | Borenstein | 364/424.029 |
| 5,229,941 | 7/1993 | Hattori | 364/424.027 |
| 5,275,568 | 1/1994 | Pfuetze | 434/153 |
| 5,377,106 | 12/1994 | Drunk | 364/424.027 |
| 5,525,883 | 6/1996 | Avitzour | 364/424.027 |

FOREIGN PATENT DOCUMENTS

| | | | |
|---|---|---|---|
| 37 09 627 A1 | 10/1988 | Germany | 364/424.027 |
| 39 12 353 A1 | 11/1989 | Germany | 364/324.027 |

OTHER PUBLICATIONS

D'Orazio, "mobile robot position determination using visual landmarks," IEEE Transactions on industrial electronics, v41 n6 Dec. 1994.

Borenstein, "real time obstacle avoidance for fast mobile robots," IEEE transactions on systems, man and cybernetics v19 n5 Sep./Oct. 1989.

(List continued on next page.)

*Primary Examiner*—Allen R. MacDonald
*Assistant Examiner*—Jeffrey S. Smith
*Attorney, Agent, or Firm*—Hill & Simpson

[57] ABSTRACT

Different bonus values and penalty values are allotted for each partial task of the unit such as, for example, drive from A to B, hold your positional uncertainty below a specific threshold, or draw up a map of the surroundings and add landmarks to it. Performance weightings for the individual tasks are yielded, in conjunction with a need to carry the latter out, after analysis of the bonus values and penalty values, and are evaluated in a control unit. Furthermore, in the context of the method a local planning horizon is specified in which the surroundings of the unit are subdivided into grid cells. Preferred directions, which lead the unit by the shortest path to already known or unconfirmed landmarks are stored for these grid cells, with the aim of reducing the positional uncertainty, or of being able to confirm a landmark. All the different routes which are possible within the framework of this grid are then investigated as to what contribution they make to enable the unit to reach the goal. In this process, the different costs and benefits per partial task are added up along each path. That route is selected which has the greatest benefit or the lowest loss. Finally, a destination which is situated outside the local planning horizon is reached by carrying out the method cyclically.

18 Claims, 7 Drawing Sheets

OTHER PUBLICATIONS

IROS '93, Proceedings of the 1993 IEEE/RSJ International Conference on Intelligent Robots and Systems, Yokohama, Japan, Jul.26–30, 1993, New York, W. D. Rencken, Concurrent Localization and Map Building for Mobile Robots Using Ultrasonic Sensors, pp. 2192–2197.

IEEE Transactions on Robotics and Automation, vol. 7, No. 4, Aug. 1991, Short Papers, J. Borenstein et al, Histogramic–Motion Mapping for Mobile Robot Obstacle Avoidance, pp. 535–539.

Soldat Und Technik (1993), H.W. Scriba, Robotik Für Das Gefechtsfeld, pp. 368–373.

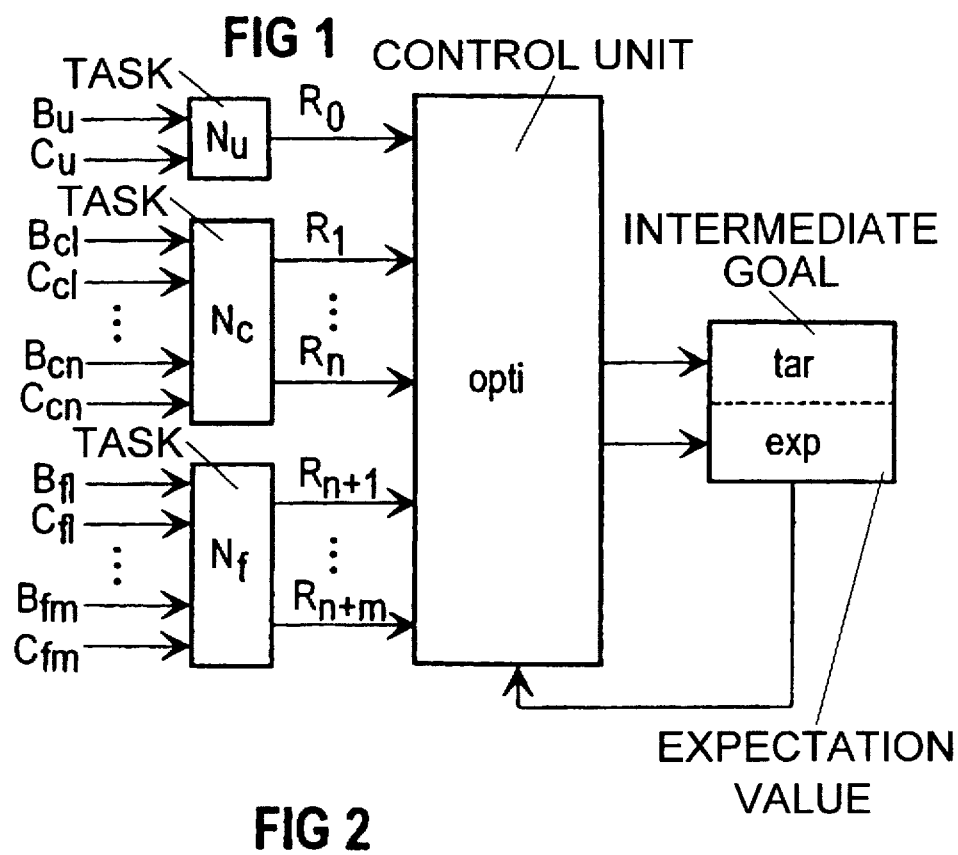
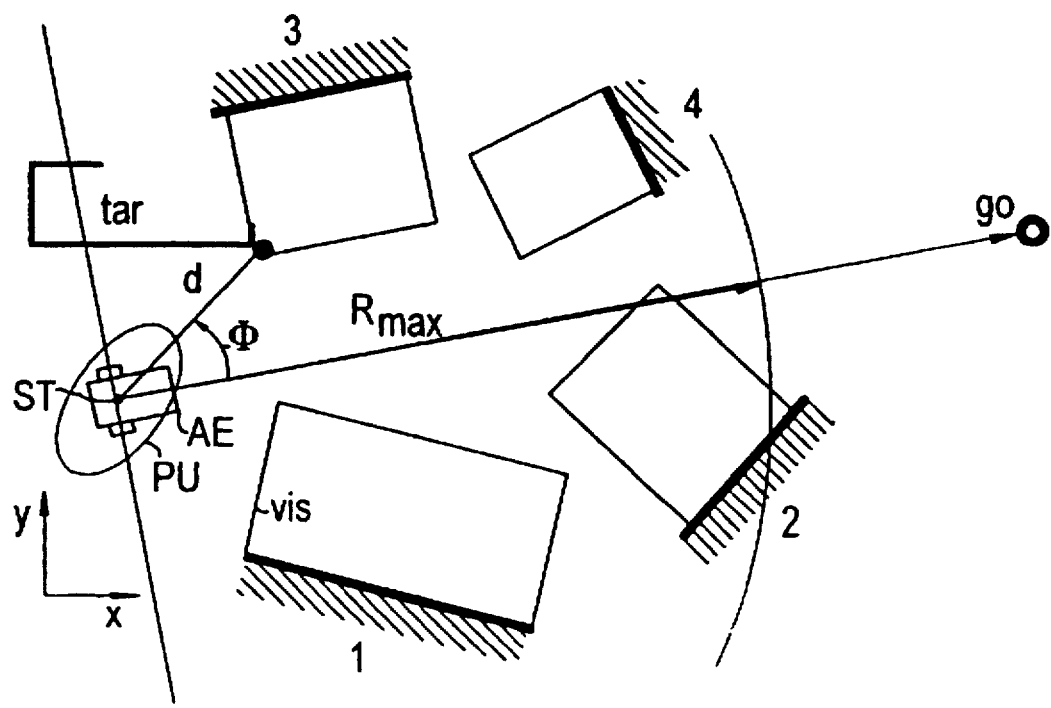

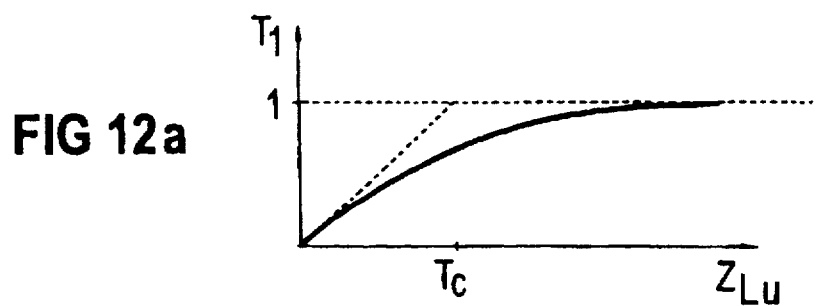
FIG 12a
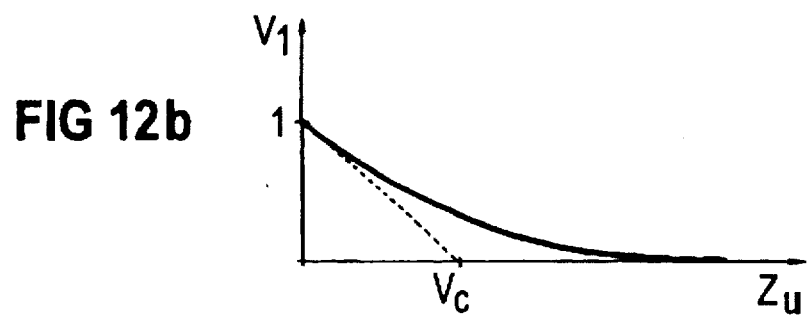
FIG 12b
FIG 13
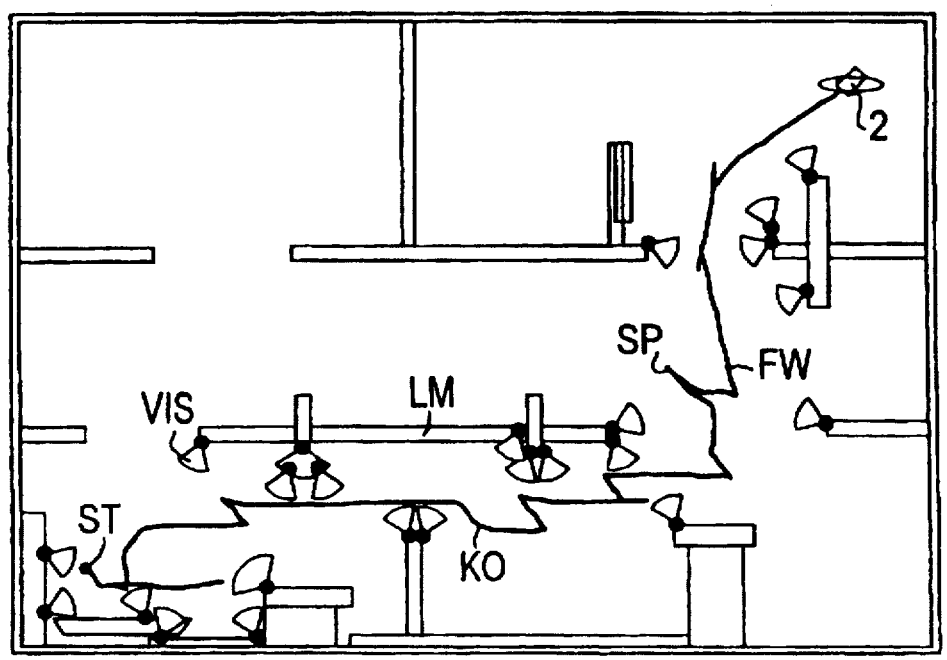

METHOD FOR THE ORIENTATION, ROUTE PLANNING AND CONTROL OF AN AUTONOMOUS MOBILE UNIT

BACKGROUND OF THE INVENTION

The most varied fields of use can be conceived for autonomously operating units. They are particularly suitable for use in danger areas and for remote sensing, but they are also capable of highly varied activities in buildings. There, they can carry out activities such as, for example, industrial vacuum cleaners, transport vehicles in the production industry or, not least, as mobile multipurpose robots. In executing these different activities, the autonomous mobile unit is confronted, however, with the problem of having to draw up a map of surroundings which are at first unknown, and of being able to use this map to locate itself at any given instant in its working environment. To solve this problem, such autonomous robots mostly have a control computer and sensors by means of which they interact flexibly with their environment. Examples of such sensors are laser distance scanners, video cameras and ultrasonic sensors.

The robot's operating procedure of orientating itself while traveling and simultaneously building up a map of the unknown surroundings poses the problem that there is a mutual functional relationship between drawing up the map of the surroundings and locating the robot. An important role is played here by, in particular, the type and accuracy of the sensors which the robot uses to survey the path it has covered and to locate obstacles in the surroundings. For example, the path covered from a starting point is determined with the aid of a wheel sensor. On the other hand, the distance from obstacles which occur is measured with the aid of distance sensors, and said obstacles are entered as landmarks in the map of the surroundings. Because of the mutual functional relationship between the measuring procedure for determining the distance of obstacles and the procedure for measuring the path distance covered in conjunction with drawing up the map and with the errors which the measuring sensors have, these errors accumulate as a function of the path distance covered by the robot.

The autonomous mobile unit can therefore no longer be manipulated sensibly from a specific limit.

A method which addresses this problem and indicates a solution for it was advanced by W. D. Rencken in the article "Concurrent Localisation and Map Building for Mobile Robots Using Ultrasonic Sensors", Proc. of the 1993 IEEE/RSJ. International Conference on Intelligent Robots and Systems, Yokohama, Jap. Jul. 26 to Jul. 30, 1993, pages 2192 to 2197. The known measuring errors of the sensors used are used there for the purpose of correcting a predicted landmark position, found with the aid of the internal map, as a function of a path distance covered. The absolute measuring error which occurs during the movement of the autonomous mobile unit is thereby reduced.

A further method for orientating self-propelled mobile units in unknown surroundings consists in that the unit builds up a two-dimensional grid of its surroundings and provides individual cells of this grid with occupancy values. The occupancy values assigned per grid cell represent the occurrence of obstacles in the surroundings.

Such a method is specified by the published document "Histogrammic in-motion mapping for mobile robot obstacle avoidance", IEEE Transactions on Robotics Automation, Vol. 7, No. 4, August 1991, by J. Borenstein and Yoram Koren. It is described there how ultrasonic sensors can be used to draw up a map of the surroundings of a self-propelled mobile unit.

The process of drawing up a map while the robot is possibly continuing to travel and being repositioned is time consuming and requires the control computer to perform computations. This hampers the robot in carrying out an activity it has been assigned.

It is therefore extremely desirable for an autonomous mobile unit not to use too much time for orientation tasks when performing a task defined by the user. However, it is also important in this case that within the contest of the task which has been set it can always maintain a defined measure of accuracy of orientation. This means, in other words, that the positional error of the autonomous robot should not overshoot a certain limit, otherwise said robot would no longer be able, for example, to deposit letters in the basket for incoming post when distributing post.

SUMMARY OF THE INVENTION

The object on which the invention is based therefore consists in specifying a method for the orientation, route planning and control of an autonomous mobile unit which enables the autonomous mobile unit to travel as short a distance as possible from a starting point to a destination, to perform a task defined by the user and, in the process, to monitor the positioning error. A partial object consists in improving the level of orientation with the aid of a grid array.

In general terms the present invention is a method for the orientation, route planning and control of an autonomous mobile unit. The unit draws up a map of its surroundings in a first routine by using an on-board sensor arrangement for surveying the surroundings. Starting from its own position the unit evaluates features of the surroundings which thus become known to it and enters them into the map of the surroundings in the form of landmarks. In surroundings it does not know completely, the unit moves in a second routine from a starting point via at least one partial goal in the direction of a destination. In so doing the unit makes use of at least the map of the surroundings and the sensor arrangement for the purpose of orientation, route planning and control.

In a third routine the unit monitors the errors, present by virtue of the measuring inaccuracy of the sensor arrangement, in the determination of its own position, as positional inaccuracy.

In each case at least one bonus value and/or penalty value is allotted for each routine to be carried out, as a function of the contribution which they make in order to enable the unit to reach its destination.

As a consequence of a common evaluation of the respective bonus values and/or penalty values in a control unit of the unit at least the routine to be carried out is determined, and the route of the unit is planned and controlled.

Advantageous developments of the present invention are as follows.

At least for one routine a weighting factor is obtained by adding up the associated bonus values and/or penalty values and multiplying by a necessity value currently valid for this routine.

At least for each routine a threshold value is fixed for the bonus values and/or penalty values upon the overshooting or undershooting of which the routine is carried out in a prioritized fashion.

In order to reduce the positional uncertainty, a landmark is deliberately approached and surveyed, the unit knowing its location in the surroundings with great accuracy.

At least one penalty value is a function of which path distance the unit must cover to perform a routine.

At least the bonus value for the second routine is a function of the angle which is formed by a selected travel direction with the start/destination axis.

Referred to elongated landmarks, at least the bonus value for the third routine is a function of the magnitude of the segment projected on to the normal of the landmark, which is produced by projecting a positional uncertainty area around the site of the unit.

A landmark whose position in the surroundings of the unit is known only very inaccurately is deliberately approached and surveyed.

The autonomous unit draws up a cellularly structured map of its surroundings in the first routine, the landmarks being distinguished as confirmed and unconfirmed landmarks as a function of the number of measuring operations affecting them and/or of the number of the locations from which they were surveyed. At least the following information is stored per cell of the map of the surroundings:

i) seen from the cell, is a landmark located in the measuring range of a distance meter on-board the unit;
  ii) if i) is answered affirmatively,
     for confirmed landmarks: the direction of distance measurement along a direction between the affected cell and at least one confirmed landmark
     for unconfirmed landmarks: the travel direction along at least one unconfirmed landmark
  iii) how often has the affected cell already been crossed.

A planning horizon is prescribed as a number of cells to be driven through in succession.

Possible travel directions of a unit are discretized such that, starting from a given cell position of the unit, each immediately adjacent cell is reached only in respectively one discrete travel direction.

For the planning horizon all the routes which can be combined using the discrete travel directions are evaluated by adding up the respectively occurring bonus values and/or penalty values in the control unit of the unit and that route is traveled which achieves the highest bonus value or lowest penalty value.

The degree-of-occupancy values which can be incremented per cell are stored as a measure of the probability of the occurrence of an obstacle.

The cells are square and consequently eight travel directions are considered; alternatively, the cells are hexagonal, and consequently six travel directions are considered.

The combined routes are evaluated in a configuration space whose space axes are bounded by the planning horizon in two axial directions. The number of discrete travel directions is bounded in a third travel direction. The same information stored in the cells is stored in the direction of the travel direction axis for all respectively superimposed cells.

At least that route cell sequence which achieves the highest bonus value and/or lowest penalty value is stored per cell of the configuration space.

One advantage of the method according to the invention consists in that bonus values and penalty values are allotted for each partial task to be performed. These bonus values and penalty values depend on the extent to which they serve the purpose of performing a task defined by the user, and the extent to which, and how optimally, the goal to be approached can be reached. It is particularly advantageous in this case that the positioning error of the autonomous mobile unit is constantly determined and included in the route planning and control of the autonomous mobile unit. When a specific threshold value for the positioning error is reached, it is therefore possible to introduce suitable measures with which this error can be reduced again.

In a favorable way, threshold values for the bonus values and penalty values can be fixed for the most varied partial tasks which this autonomous unit is to perform, so that it is possible as a function of these threshold values and their being overshot or undershot to introduce special measures for performing this task or to perform this partial task as a priority.

The method according to the invention advantageously provides, for the purpose of reducing the positioning error, to steer the autonomous mobile unit to a known obstacle in its surroundings whose position is known very accurately as a landmark in the unit's map of the surroundings, to measure said position, and to use this measured value to correct the unit's own location and the location of the landmark in the map of the surroundings. In this way, the positioning error is reduced in a simple way precisely at the instant when required.

Since, when the unit is measuring the path, the errors which occur are a function of the path distance covered, the method according to the invention advantageously provides to render at least one penalty value dependent on the path distance covered by the unit between a starting point and an intermediate goal or that point at which the last orientation was carried out.

The method according to the invention advantageously further provides to cause the unit to travel as far as possible in the direction of a prescribed destination by allotting a bonus value as a function of the angle which the current travel direction forms with the prescribed direction from the start to the goal.

The method according to the invention advantageously provides to determine the bonus value which is yielded by approaching a known elongated landmark in the surroundings by projecting the positional uncertainty area on to the normal of this landmark and using the segment produced as a measure of the bonus value.

For the purpose of improving the orientation of the autonomous mobile unit, the method according to the invention advantageously provides to improve the position of a not very accurately known landmark in the map of the surroundings by deliberately approaching it and surveying it. Accurate knowledge of a plurality of landmarks in the map of the surroundings makes it easier for a unit to reduce the positioning error at the most varied points on its journey.

A particular advantage of the invention consists in that the task of drawing up the map is facilitated by subdividing the near surroundings of the automotive unit into cells. The cells are subsequently occupied by values which make it easier for the unit to perform its different partial tasks. It is then, for example, immediately clear whether an obstacle is located in the visual range of a measuring sensor, or how often the cell has already been crossed, so that it can be assumed therefrom that this cell is not helpful in the task of drawing up the map. Furthermore, the storage of preferred travel directions per cell of the map of the surroundings immediately makes it clear in which direction a landmark is located, irrespective of whether it is confirmed or unconfirmed, with the result that with regard to the task of drawing up a map and the task of minimizing the positional error it is possible to approach a landmark appropriately, and the direction is accurately known by means of which a sensible measurement result is obtained.

The method according to the invention can advantageously also be combined with already known orientation methods in cellularly structured surroundings, by introducing, in addition to the cell features claimed in claim 1 degree-of-occupancy values which specify a probability for an obstacle in the map of the surroundings, which leads to a shorter computing time in the route planning of the automotive unit.

The map of the surroundings can advantageously be parcelled into square cells, with the result that eight travel directions are possible and there is a corresponding reduction in the computing outlay for route planning.

The cellularly structured map of the surroundings for the method according to the invention can advantageously also have an hexagonal structure, it thereby becoming possible to achieve a larger planning horizon by comparison with the square grids, in conjunction with a comparable computing performance.

It is particularly favorable to consider a planning space in which the various discrete orientations of the vehicle make up one axis and the x and y axes make up the other axes. Each route can be distinguished from another in this planning space. It is advantageous for the items of information which are to be stored per cell in accordance with claim 1 or 2 subsequently to be superimposed in planes so that the obstacle situation in the planning space is the same for every orientation of the unit.

It is advantageous to bound the planning space and to select routes which supply the most favorable bonus value or penalty value, since they perform the partial tasks of the autonomous mobile unit with the most sparing use of resources, for example. The outlay for calculating the route can be limited by means of the planning horizon.

It is particularly favorable to compose the resultant benefit of various partial benefits and to weight these by means of priorities, since in this way optimum route planning is rendered possible as a function of the weighting of the different partial tasks. In the task of drawing up the map, it is favorable to consider the most varied factors, which also include how many landmarks are visible from a cell, what is the relationship of the current travel direction to the stored travel directions, how often has this cell already been crossed, and to include the ratio of the number of the confirmed and unconfirmed landmarks as weighting factor.

Two ways are advantageously available for calculating in accordance with the invention the resultant benefit for an individual route inside a cell by weighting the bonus value, yielded from the direction of the positional error, additively, on one occasion, and multiplicatively, on the other occasion. In practice, this produces good routes for the autonomous mobile unit.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows an example of implementation for the method according to the invention.

FIG. 2 shows an autonomous mobile unit with accurately and less accurately known landmarks.

FIGS. 12a–12b shows weighting functions for the visit counter of a cell, and the number of the unconfirmed landmarks detectable from the cell.

FIG. 13 shows the route of an autonomous mobile unit in surroundings unknown a priori.

DESCRIPTION OF THE PREFERRED EMBODIMENTS

Figure 3:
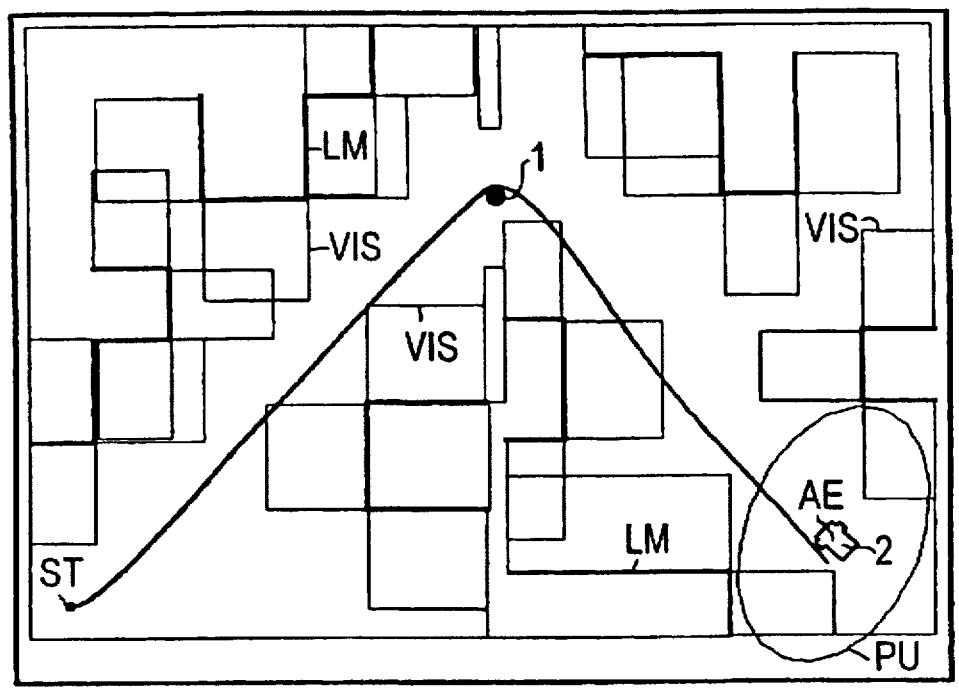
FIG. 3 shows an example of a route of an autonomous mobile unit in surroundings where there are obstacles, in conjunction with the positioning error.

FIG. 1 shows as an example an architecture of the method according to the invention, in the form of a block diagram. Represented here are three tasks, the necessity factors of which are entered into the corresponding boxes, which respectively symbolize the partial task. These are denoted by $N_u$, $N_c$ and $N_f$. The index u is used here for the task defined by the user, that is to say, for example, deliver post, paint walls or do similar things, such as have already been outlined at the beginning in the technological background. The positioning uncertainty of the mobile robot is monitored in the second task, which receives index c. The third task, which receives index f, consists in supplying new landmarks to the map of the surroundings. This is performed by the autonomous mobile unit surveying the path it has covered and using its sensors to determine the distance to obstacles in the surroundings. These obstacles are subsequently entered as landmarks in the map of the surroundings which the autonomous unit has on-board.

The individual partial tasks are assigned bonus values and penalty values, denoted by B and C respectively, in the representative example of architecture. These values yield the necessity to perform a task which leads to a weighting factor R, which is evaluated in the control unit opti and from which, for example, an intermediate goal tar and an expectation value exp are calculated. In this example, necessity factors $N_u$, $N_c$ and $N_f$ are additionally allotted for the individual tasks. In order to determine the weighting factor R, it is possible, for example, to form the difference between the bonus values and penalty values for the respective partial task and to multiply it by this necessity factor N to form a weighting factor R.

$$R(\phi)=N(B \cdot C)$$

Several partial processes can also be evaluated by the control opti without limiting the controller. All that is required is to determine the bonus values and penalty values for the individual partial tasks as a function of the partial tasks set, and it can also be useful here, as the case may be, to fix a necessity factor for performing such a partial task. The bonus values and penalty values for the respective partial task are selected in a sensible way so that maneuvers such as contribute to performing the task, defined by the user, of the mobile unit U are provided with bonus values, and those such as, for example, divert the mobile unit from its travel direction or delay the temporal sequence of the activity are provided with penalty values. It is possible, for example, to favor directional deviations from the prescribed start/go direction which are very small with a bonus value, but it is also possible to disadvantage positional uncertainties, which overshoot a specific magnitude, with a penalty value. It is also conceivable to avoid a long route between two intermediate goals on the way from the starting point to the destination by means of large penalty values. It is also conceivable that in the case of surroundings which contain many obstacles of which only a few are accurately known in the unit's map a suitable allocation of bonus values and penalty values will force the unit to survey correspondingly more obstacles and enter them in the map of the surroundings as landmarks. Basically all influencing factors which are related to the journey of the autonomous robot or to carrying out the individual activities with which it is commissioned are suitable for allotting bonus values and penalty values. For example, it can also be favorable to evaluate the time response, the driving speed, or the power consumption of the mobile unit.

Suitable for fixing the necessity factor $N_c$, which controls the partial task of a unit to keep the positional uncertainty low, is, for example, the area A which is formed by the positional uncertainty about the current location of the mobile unit. In other words, the area meant by this is that which, as a function of the sensor measuring errors which accumulate over the journey by the unit, specifies a probable stopping place around a position of the unit which is currently entered in the map.

For example, the area can be used as a measure of this necessity to correct the positional uncertainty. If the area undershoots a minimum value min, this partial task can be prevented from being activated, for example; and if this specific area overshoots a specific value max, performance of this partial task can be enforced. In the intermediate range, it is recommended, for example, to relate the current area to the difference between the minimum and the maximum, in order thus to obtain in a linear fashion as a function of the currently present positional uncertainty area a necessity factor for the performance of the position correction. It then holds, for example, that:

$$N_C = \begin{cases} 0 & A \leq \min \\ \frac{A - \min}{\max - \min} & \text{otherwise} \\ 1 & A \geq \max \end{cases}$$

The necessity factor $N_u$ for performing the task defined by the user can, for example, be rendered a function of how much of this task has already been performed. A high factor can be allotted at the start of the activity and be reduced toward the end of the activity. For example, for the bonus values in this case it holds that:

$$B_u(\phi) = \begin{cases} 1 - \frac{|\phi - \phi_M|}{\pi/2} & \text{for } |\phi - \phi_u| < \pi/2 \\ 0 & \text{for } |\phi - \phi_u| \geq \pi/2 \end{cases}$$

with $\phi$: angle between the start/goal direction and the current travel direction.

As the calculating basis for determining the necessity $N_f$ of adding a new landmark to the map, it is possible to use, for example, the number of the absolutely detected obstacles in conjunction with the number of already confirmed obstacles in the map. The ratio of the defined known landmarks and inaccurately known landmarks represents a sensible measure of how accurately the unit can currently orientate itself, and thus leads to a sensible weighting factor for the task of drawing up the map. It holds for the penalty value which is yielded when an inaccurately known landmark is approached that, for example:

$$C_e(\phi) = C_e(\phi) = \begin{cases} \frac{d(\phi)}{D\_\max} & \text{for } d(\phi) < D\_\max \\ 1 & \text{otherwise} \end{cases}$$

with:

d: current driven distance of the unit

D__max: maximum permissible driven distance.

A possible strategy for planning and driving an optimum route can be to select a direction which fulfills as many sub-goals, that is to say partial tasks, as possible. However, it can also be sensible, for example, initially to perform that task which receives the maximum weighting factor. For sensible route planning, however, it can also be sensible to select only those intermediate goals which are located within an angle of 90° between the start/goal direction and the current direction of movement, in order to deviate as little as possible from the travel direction to the goal.

If, for example, the weighting maximum is yielded from the task defined by the user, the distance to an intermediate goal is maintained, for example. In the other cases, in which the weighting factors of the other partial tasks dominate, the path into the visibility region of an obstacle whose position is to be determined is determined, for example, as the distance and serves for calculating the destination coordinates for the intermediate goal. Visibility region means the range in which the distance meter sensor can determine the position of an obstacle, that is to say its distance, with high accuracy. For example, in the case of the task of drawing up the map or of the task of position correction an intermediate goal is selected here which is located at the edge of the visibility region of an obstacle.

FIG. 2 shows a scenario as an example for an autonomous mobile unit AE in its surroundings. It can be seen that here the position of a unit in the map of its surroundings and the known obstacles are represented as they are contained in the memory of the unit's controller. The starting point ST and a destination go are shown. $R_{max}$ denotes, for example, an observing horizon or an evaluation horizon for control measures and intermediate goals of the unit. Furthermore, a coordinate system xy is shown, and obstacles 1 to 4 are present. The obstacles 1 and 2 are, for example, entered as confirmed landmarks in the map which the autonomous mobile unit draws up and uses for orientation. That is to say, the coordinates of these obstacles have been measured frequently and are now fixed with high accuracy. For reference purposes, for example in order to correct the positional uncertainty, these obstacles 1 and 2 can be approached and surveyed with a sensor. The specific distance and the current knowledge of the location of the obstacles in the map serves the purpose of reducing the positional uncertainty. The obstacles 3 and 4 do not represent any such confirmed landmarks, rather their location is affected by an inaccuracy. For example, these obstacles have been detected on the edge of the visibility region of the sensors and have not yet been more accurately surveyed. A first measurement has, however, led to these obstacles being entered in the map of the surroundings.

The individual visibility regions vis are shown for the individual obstacles, both the confirmed ones 1 and 2 and the unconfirmed ones 3 and 4. These visibility regions are described in the form of rectangles vis around the landmarks. A visibility region results from the detection range of the sensors and the dependence of their measuring accuracy as a function of the distance which the sensor measures and of the desired accuracy for confirmed landmarks. In order to be able to determine the location or the distance of such an obstacle 1 to 4, the sensor, which is mounted on the self-propelled mobile unit AE, must be located at least at the edge of such a visibility zone vis. It is then possible to measure the distance exactly. For the purpose of illustration, a positioning uncertainty area is drawn around the autonomous unit AE. This area PU has the form of an ellipse. As is to be seen further, this ellipse is not arranged symmetrically about the unit. Rather, the angle of rotation of the ellipse in relation to the longitudinal axis of the unit AE results from the fact that before the point ST was reached different driving maneuvers had been carried out in the foreground, and have led in the different directions xy of the coordinate system to a diverse accumulation of measuring inaccuracies.

Also entered in FIG. 2 is an intermediate goal tar. The distance between the starting point ST and the intermediate goal tar is denoted by d. The angle which the selected travel direction to the intermediate goal tar makes with the start/goal direction ST-go is denoted by $\phi$. A bonus value, which is used in the method according to the invention, can be rendered dependent on this angle $\phi$, for example. It would be sensible not to let this angle become larger than 90°, since otherwise there is no movement in the direction of the goal. In the example in FIG. 2, an intermediate goal has been selected which is located at the edge of the visibility region vis of a non-confirmed landmark 3. That is to say, the result of evaluating the individual partial tasks in conjunction with the bonus values and penalty values is that the task $N_f$ of drawing up the map is to be carried out. As a function of the necessity factors $N_u$, $N_c$ and $N_f$ in conjunction with the weighting factors $R_0$ to $R_{n+m}$, the control unit opti has determined this intermediate goal tar in order to approach it next. Furthermore, an expected intermediate destination exp is stored in the unit's memory on the basis of the positional uncertainty. Such a driving maneuver of the autonomous unit can be sensible, for example, whenever sufficient information on the surroundings is no longer present, or when the positional uncertainty has risen sharply and no confirmed landmarks are present any more in the vicinity of the autonomous unit. In the longer term, the result of this would be that the positional uncertainty can be further increased and the path to the goal go can no longer be found, since new landmarks can no longer be accurately determined and the current position of a unit relative to the control computer is no longer known.

FIG. 3 shows as an example the path covered from the starting point ST to the destination 2 of an autonomous unit AE. The method according to the invention is not applied in this example. Individual landmarks LM are detected on the path to an intermediate goal 1 and, as represented in FIG. 3, the autonomous unit AE drives directly to the intermediate goal 1 without going into the visibility zones vis of the individual landmarks LM in order, for example, to correct the positional uncertainty. This positional uncertainty results from the inaccuracy of the sensor measurements and the accumulation of the error of the individual sensors over the path distance covered by the autonomous unit. Having arrived at the goal 2 of its journey, the autonomous unit accordingly has a very high positional uncertainty PU, represented here in the form of an ellipse. Here, this means that for the control computer of the autonomous unit the unit is located at the goal 2, but that the positional uncertainty has increased to form the ellipse PU owing to the increased measuring errors of the individual sensors of the mobile unit. Although the current location of the unit is thereby marked in the map, any stopping place inside the positional uncertainty area PU is possible for the unit. In conjunction with the performance of a task defined by the user, it can easily be seen that, owing to the large error characterized by the positional uncertainty, the unit can no longer be positioned exactly.

Figure 4:
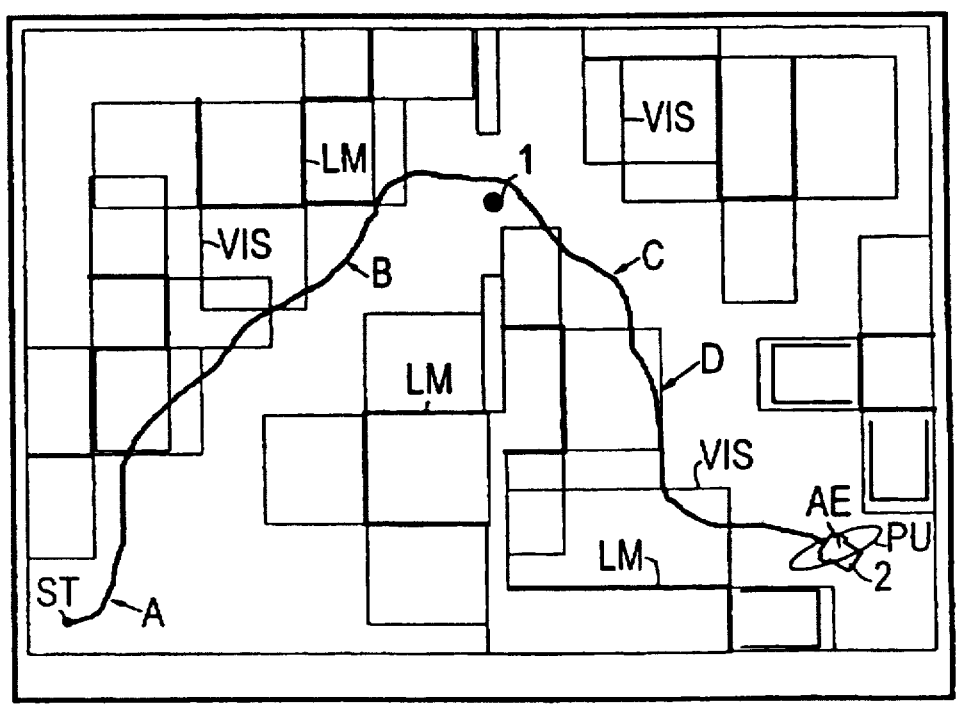
FIG. 4 shows an example of the route of an autonomous unit which is performing the method according to the invention.

FIG. 4 shows the route of an autonomous unit AE through surroundings obstructed by obstacles between a starting point ST and a destination 2. The surroundings are in this case the same as those in FIG. 3. Here, as well, landmarks LM and visibility regions vis are represented again in the surroundings. By contrast with the mode of procedure in FIG. 3, here the method according to the invention is used in the route planning and control of the autonomous unit. It is clear to see that the autonomous mobile unit no longer drives directly to the intermediate goal 1 and then immediately to the end point 2, but rather that the unit's route leads through a plurality of visibility regions vis of landmarks. This route is produced, for example, when a partial task of the unit consists in keeping the positional uncertainty below a specific threshold value. As can be seen, the positional uncertainty overshoots this threshold value at the points A, B, C and D. By weighting the individual necessity factors in conjunction with the weighting factors N and evaluating the individual bonus values and penalty values B, C, the control unit takes the decision to proceed at these points in the direction of the visibility region of a known landmark LM. By driving into the visibility region of such a landmark, the latter can be surveyed exactly and the separation thus obtained can be compared with a value which results from the current position in the map and the stored position of the landmark. The absolute positional uncertainty can be reduced in this way with the aid of this measurement. As it is easy to see, the repeated application of this method produces at the end of the route at the destination 2 a much lower positional uncertainty PU than was the case for FIG. 3. Thus, the autonomous unit can perform a task defined by the user with a higher exactitude. At the same time, however, the method according to the invention limits the quantity of error correction measures to the smallest possible extent. This results in an optimum time response in performing a task defined by the user by the autonomous mobile unit.

Figure 5:
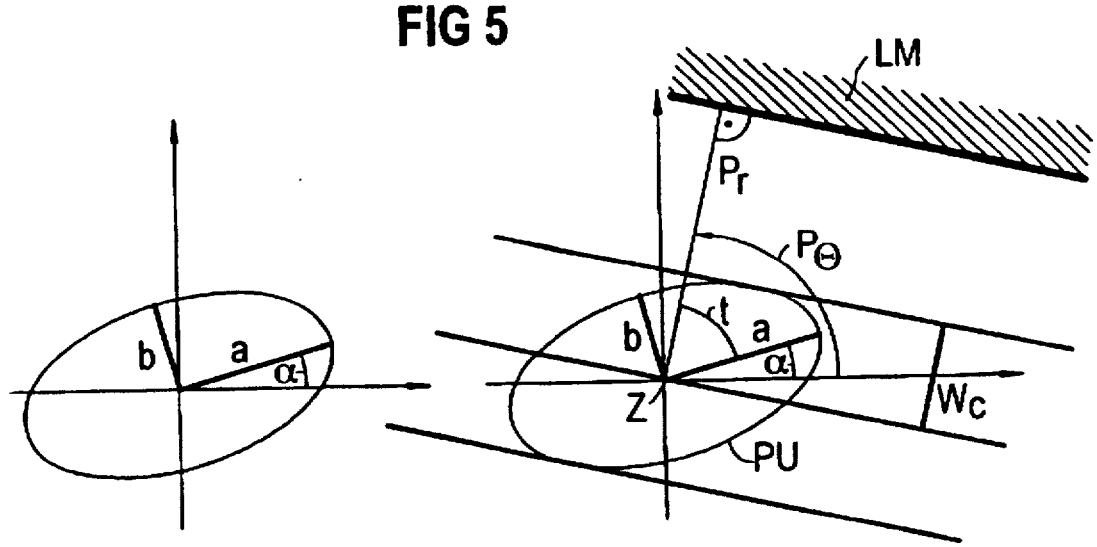
FIG. 5 shows an example of the allotting of a bonus value.

FIG. 5 illustrates the example for allotting a bonus value when approaching an elongated obstacle LM for the purpose of positional correction of the autonomous mobile unit. The unit is situated at the location Z in front of the confirmed landmark LM. During the journey of the mobile unit, the positional uncertainty has been added up to produce an ellipse with the semiaxes b and a. The semiaxis a forms the angle t with the surface normal to the elongated obstacle LM, which is denoted by $P_r$, and the semiaxis B forms the angle $\alpha$ with it. The projection of the area of the ellipse on to the surface normal of the landmark LM, the surface normal being denoted by $P_r$, produces the distance $W_c$ as a measure of a bonus value for performing the task of positional correction. Only half the distance which would be produced by projecting the ellipse on to the surface normal is represented here. However, since in this example the bonus value is selected to be proportional to this distance, only a factor 2 is concerned here and not a qualitative difference.

The position of the unit relative to a given instant k can be specified according to Rencken as follow:

$$x(k)=[x(k),y(k)]^T$$

The covariance matrix:

$$Q(k) = \begin{bmatrix} \sigma_x^2 & \sigma_x\sigma_y \\ \sigma_x\sigma_y & \sigma_y^2 \end{bmatrix}$$

with:

$\sigma_x$ uncertainty in the x-direction $\sigma_y$ uncertainty in the y-direction holds in this case for the positional uncertainty.

Figure 6:
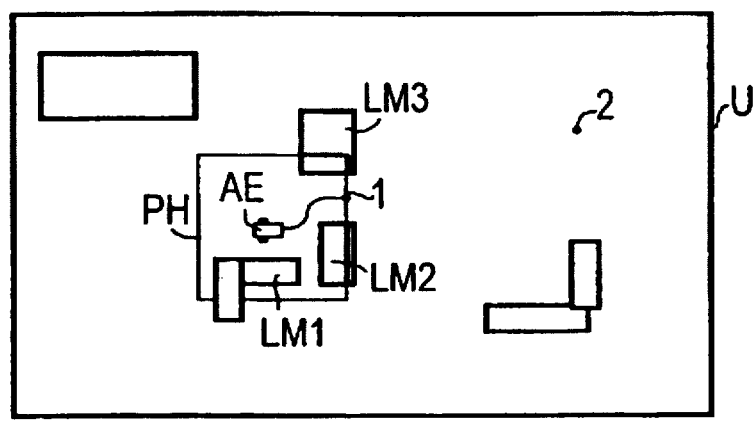
FIG. 6 shows an autonomous mobile unit in its surroundings.

The map M(k) of the surroundings, which is composed from a map for confirmed landmarks $M_c$ (k) and unconfirmed landmarks $M_t$ (k) can be formalized in this case as follows:

$$M(k)=\{(P_f(k), \Lambda_f(k), \text{vis})|1 \leq f \leq n_f\}=M_t(k) \cup M_c(k)$$

with:

$\Lambda_f$(k) uncertainty of landmark $p_f$ vis visibility region $n_f$ number of landmarks FIG. 6 shows the surroundings U of an autonomous unit AE. A planning horizon PH of the autonomous mobile unit is located in the surroundings U. Landmarks LM1 to LM3 are to be seen inside the planning horizon. The goal 2 of the autonomous mobile unit is located inside the surroundings but outside the planning horizon PH. In order to reach the goal 2, in accordance with the method according to the invention the unit must firstly structure the region in the planning horizon in a cellular fashion and explore a route inside this planning horizon. This route leads to a partial goal 1. During its journey through the surroundings, the unit can, for example, carry the planning horizon with it by always carrying with it the center of the cellularly structured map of the surroundings and, as it were, shifting the planning horizon over the surroundings like a window.

Figure 7:
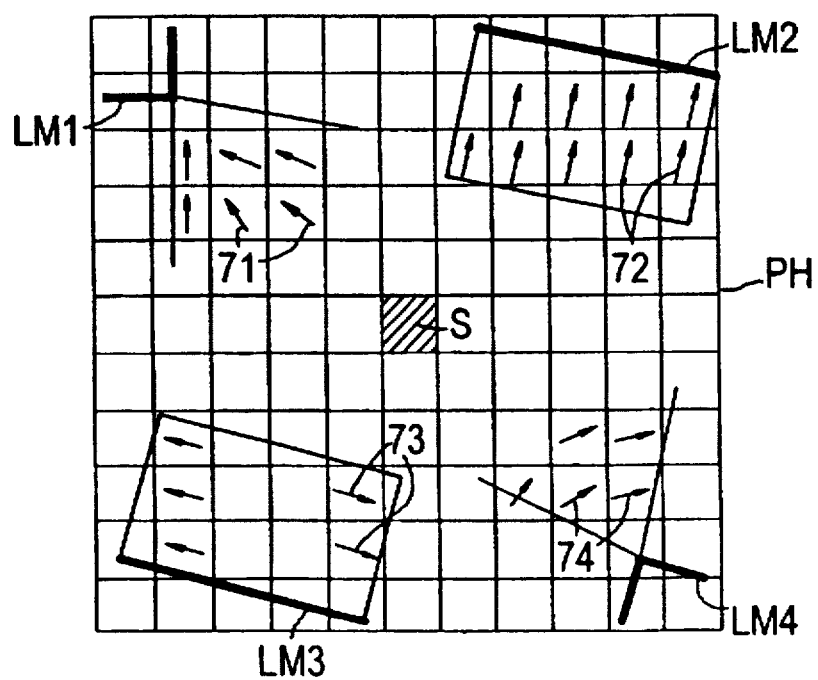
FIG. 7 shows a cellularly structured map of the surroundings with a planning horizon.

FIG. 7 shows a cellularly structured map of the surroundings inside a planning horizon PH. The unit is located in this case at the center of the map in a starting cell S. Various landmarks LM1 to LM4 are entered inside the map of the surroundings and the planning horizon PH. LM1 and LM4 are edges in this case. LM3 and LM2 are linear extending landmarks.

Directional arrows 71 and 72 are specified for the landmarks LM1 and LM2 and symbolize a preferred measuring direction in which the unit is to measure in order to be able to survey the respective landmark accurately. According to the method of Rencken, it is possible in this way to reduce the positional error of a unit. As can further be seen, these arrows are stored inside cells which are located in the visibility region of the respective landmark. Visibility region means in this context that the landmark can still just be detected reliably by a distance meter of the unit. These cells are represented in dark gray in FIG. 7 here. The information specified here, which is stored per cell, is not in any way to be regarded as a complete enumeration; it is entirely conceivable that other information which is favorable for orienting the autonomous mobile units can also be stored as cells. It is also conceivable to select a coarser or finer cell array. For example, planning level 5 has been selected here in order to reduce the outlay on computation inside the control unit of the autonomous mobile unit to an acceptable amount.

Preferred travel directions, which are denoted here by 73 and 74, are also stored for the cells which are located in the visibility region of landmarks LM3 and LM4. Since LM3 and LM4 are landmarks which have not yet been confirmed, these directional arrows point along the landmarks, in order in this case to make it easier for the autonomous mobile unit which covers this route to confirm or reject a landmark. If a route which is planned crosses a cell occupied by a travel direction, it is possible to evaluate how the alignment of the unit behaves in relation to the stored travel direction, and this relationship can serve as a measure of the fixing of a bonus value for this current route.

The method according to the invention assumes in principle that it is possible to reach a specific remote goal (for example, drive to a specific point which is very far removed, explore a building complex). However, it is only paths which have a few seconds driving time and require a planning horizon of a few meters which are explicitly planned/searched for in advance.

The information gathered during the journey and relating to the relatively near surroundings of the autonomous mobile unit, such as obstacles and confirmed and provisional landmarks are stored in a local representation of an environment. A local path planning method is then used, for example, to search for an optimum local route. The search is performed, for example, by estimating the expected costs and benefits along this route, starting from the instantaneous state of the unit. Costs may be regarded, for example, as the path length or the magnitude to be expected of the positional uncertainty. Benefits are, for example, finding new landmarks, approaching a destination prescribed by the user, or reducing the positional uncertainty. When setting up the cost functions and benefit functions use is made, for example, of heuristics which are yielded from observing and analyzing the localization process used.

The optimum partial path thus found is then, for example, traveled by a control unit of the autonomous mobile robot, it being possible for unexpected obstacles to be automatically bypassed, for example. During this journey, it is constantly monitored, for example, whether the expectations set during planning (for example, behavior of the positional uncertainty) are also actually fulfilled. In the case of substantial deviations, which are possible at any time owing to the incompleteness of the knowledge of the surroundings, new planning is initiated, for example. Otherwise, after the planned path has been traveled the search for a path is begun anew and a further segment is planned in local surroundings. This process is performed, for example, cyclically until the prescribed remote goal has been reached.

In order to discretize the search space, the relatively near surroundings of the autonomous mobile unit (a few meters) around the current position of the autonomous mobile unit are subdivided into grid cells. These are located, for example, at the center of this grid. The grid cells are occupied by attributes which reflect the information about the surroundings. For example, during each planning operation current information from different sources is assigned to the local planning grid. The following attributes, for example, are stored for each grid cell.

1. Whether a landmark is located in the visibility region. The visibility region is a function of the range and the characteristics of the sensors. For example, rectangles or circular segments can be taken for lines or point landmarks. Other visibility regions are conceivable. If the sensors are able, for example, to detect landmarks only at a specific distance, this could result in narrow bands as visibility regions.

The positional uncertainty can be reduced in such cells, which are situated in the visibility region of one or more confirmed landmarks. For example, the match direction is stored for each landmark. For an elongated landmark LM2, 72, for example, this direction is at right angles to the wall. In the case of point landmarks LM1, however, the match direction is situated, for example, on the connecting straight line from the cell center point to the landmark 71. If exactly one landmark can be seen from a cell, the positional uncertainty can be reduced only in the match direction. If a plurality of landmarks can be seen, the uncertainty ellipse is compressed in a plurality of directions. The rotational uncertainty can also be reduced by a plurality of landmarks.

Figure 8A:
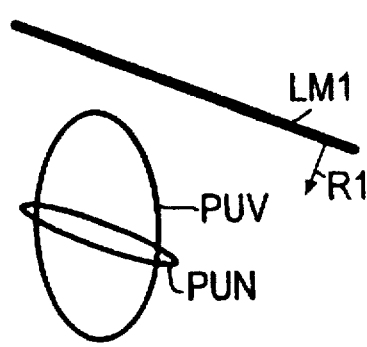
FIGS. 8a–8c shows examples for reducing the positional error.

FIG. 8 shows three situations and positional uncertainty corrections associated therewith. An elongated landmark LM1 is to be seen in part a). A third measuring direction R1 is at right angles to it. This measuring direction R1 is stored, for example, in those cells which are located inside the visibility region of a distance measuring probe mounted on a movable vehicle when said probe has just detected the landmark LM1. For example, within the scope of the various routines which are carried out by the autonomous mobile unit, it can be necessary to carry out a positional correction and again to reduce the positional error which has been increased, for example, by odometry errors. The method of Rencken provides for surveying a landmark accurately with the aid of the distance measuring sensors, and for determining a position for correction purposes via the known initial position of the unit and the change in position resulting from the path distance covered. Before arriving in the visibility region of the landmark, the positional uncertainty is given, for example, by an ellipse PUV. By moving the autonomous mobile unit in the direction R1, that is to say at right angles to the landmark, the positional uncertainty is reduced in this direction. Finally, the positional uncertainty ellipse PUN is produced.

Figure 8B:
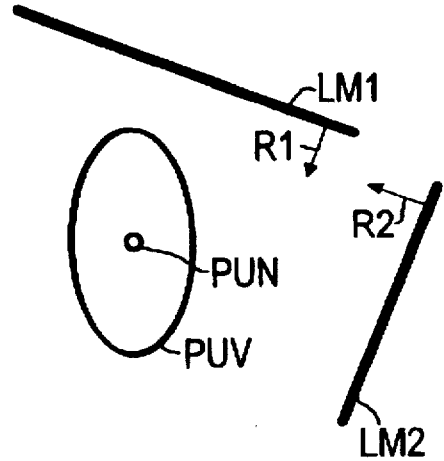

FIG. 8b) shows the same case. However, two landmarks LM1 and LM2 are present here. Shown at right angles thereto are corresponding preferred measuring directions R1 and R2 in which a self-propelled mobile unit can perform a positional correction. It is not necessary for this purpose that the unit measures or drives exactly in these directions, but in this way an optimum error correction is achieved through a minimum extent of outlay. By comparison with 8a), it can be seen that the positional uncertainty ellipse PUV shrinks to a very small ellipse PUN, since it is possible here to perform a positional correction in two orthogonal directions, the ellipse being compressed in both directions as a result. This renders it possible that the benefit for a positional correction is a function of the number of the confirmed landmarks.

Figure 8C:
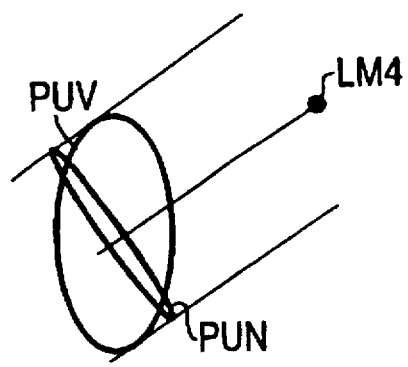

FIG. 8c) illustrates the positional correction in conjunction with a punctiform landmark LM4. The visibility region can be configured as follows, for example, around such a landmark. The maximum measuring range of the sensor is fixed as a distance, and this distance serves as radius for an arc which is drawn around LM4 as center. This produces a circular arc. Located between this circular arc and LM4 are cells for which radially extending optimum travel directions for detecting the landmark LM4 can be stored. It can be seen that the positional uncertainty PUV can be reduced with the aid of such a landmark just as with the aid of an elongated landmark. The positional uncertainty ellipse PUN is obtained after the correction.

For example, a preferred travel direction for the autonomous mobile unit is stored for each cell which, referred to the distance measuring sensor of the unit, is located in the visibility region of an unconfirmed landmark. It is assumed in this case that the landmark can be optimally surveyed in this direction in particular. If the unit extends longitudinally and a plurality of distance measuring sensors are arranged parallel to the longitudinal sides, it is possible, for example, to detect walls particularly well when a preferred direction extends parallel to the wall. In addition, information can be stored on whether a cell is located in the visibility region of a provisional landmark. If this is the case, a preferred travel direction is stored in such a cell and is intended to have the result that the landmark can be quickly confirmed or finally rejected. In the case of a wall-shaped landmark, such a favorable travel direction (confirmation direction) is situated, for example, parallel to the wall. However, a corner can be confirmed particularly well as a punctiform landmark, when the unit goes round it on a circular path. Other criteria (for example, preferred distance from the landmark) are also conceivable, depending on the type of the distance measuring sensor. For example, as also described by Borenstein and Koren, degree-of-occupancy values can be allotted to the cells, and the cells can be stored there. These degree-of-occupancy values specify the probability of stay for an obstacle in this cell.

In addition, it is possible to keep for each cell a counter in which it is noted how frequently the unit has already crossed this cell. When new landmarks are being sought, it is possible subsequently to prefer, for example, those cells which have not yet been crossed so frequently by the unit.

Figure 9:
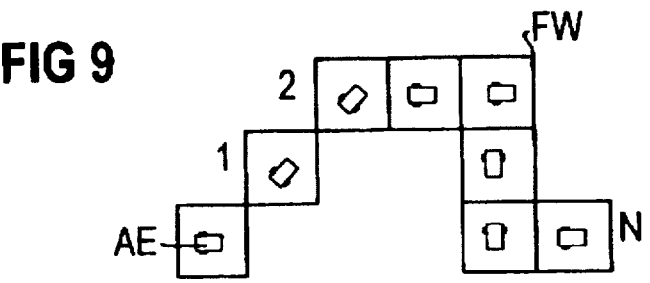
FIG. 9 shows a route which is composed of discrete travel directions.
Figure 10A:
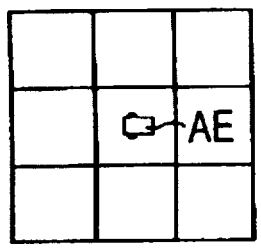
FIGS. 10a–10d shows an autonomous mobile unit and possible sequential positions, as a function of the discrete travel directions.
Figure 10B:
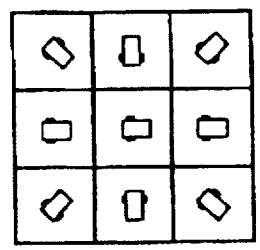
Figure 10C:
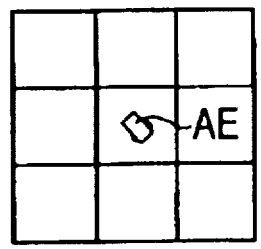
Figure 10D:
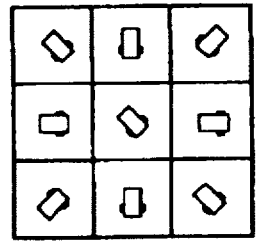

FIG. 9 shows the planned route FW for an autonomous mobile unit AE. The planning horizon N is seven cells here. This route FW is selected in the surroundings, within the scope of the local planning horizon and of the grid, in such a way that the tasks being performed by the unit lead to a penalty value which is as small as possible or to a large bonus value. For example, preference is given to a route such as delivers a particularly high bonus value. Such routes FW bring together the combination of a plurality of partial tasks in a particularly optimum way.

Different orientations of the vehicle can be prescribed discretely, in order to ease the calculation when planning the route. In the case when a square basic grid has been selected, eight cells surround a central cell, for example an initial cell in the case of a movement operation of a mobile unit. A sensible discretization thus represents here an angle of 45° between the individual orientations. Route planning therefore requires eight cases to be investigated in each case, starting from a starting cell and going to a neighboring cell. In the case of an hexagonal grid, for example, only six neighboring cells would arise and, consequently six discrete travel directions, which in each case form an angle of 60° with one another.

FIG. 10 shows examples of travel directions in a square basic grid. An autonomous mobile unit AE at the center of such a grid structure is to be seen in FIG. 10a. FIG. 10b shows as an example the changes in travel direction which such a unit can perform and which are to be investigated within the scope of route planning from one cell to the next cell. FIGS. 10c and d show another example. In comparison with FIG. 10a, the initial position was selected differently in FIG. 10c, and this then entails different subsequent positions in FIG. 10c. It is important in this case to bear in mind in the case of transfer from one cell to another cell the travel direction can either be changed in a discrete step or can be maintained. Furthermore, it is important to take into account that the unit can drive both forwards and backwards, so that it is possible overall by driving backwards and forwards to reach these eight neighboring positions from the initial cell.

A search is made for the route through the local planning grid, for example after the grid cells have been assigned. An attempt is made in this case to do justice to the tasks according to the user in the sequence of their prescribed priorities. The aim is in this case to find a path which entails a resultant benefit which is a maximum at the planning level N. The required computing time for the path search is decisively influenced by the planning horizon N. The planning horizon N is preferably between 10 and 20. A grid size of, for example, 30×30 cm results in a planning horizon of 3 to 6 m.

The search for the optimum path starts, for example, in the center cell of the local grid with the appropriate orientation of the autonomous mobile unit. All the end configurations after search step i serve as initial points for the search step (i+1). As an example, the maximum of eight possible subsequent configurations are investigated in each case for these. Nine resulting benefits $R_N$ are determined from this in each case. Thus, in route planning a new route is searched for in such a way that the cells searched through propagate like waves in the configuration space, starting from the starting cells. After N search steps, the path is followed back to the starting cell for the route having the highest resultant benefit $R_N$. The resultant benefit can be a function, in this case, of the evaluation function B of the various partial tasks, and of the quasi-collected benefit along the path.

$$R_N = f(B_u, B_c, B_f)$$

A resultant benefit function has the following appearance in principle:

$$R_N = \alpha_u * B_u + \alpha_c * B_c + \alpha_f * B_f$$

Benefits are collected and weighted in accordance with the priorities for all the partial tasks along the tested path. Costs can also arise along the path (for example, positional uncertainty increases, power consumption), which can be subtracted from the selected benefits. At the end, that path is selected which offers the highest benefit with the costs subtracted. The evaluation criteria for the individual partial tasks are described in the following tasks.

Figure 11:
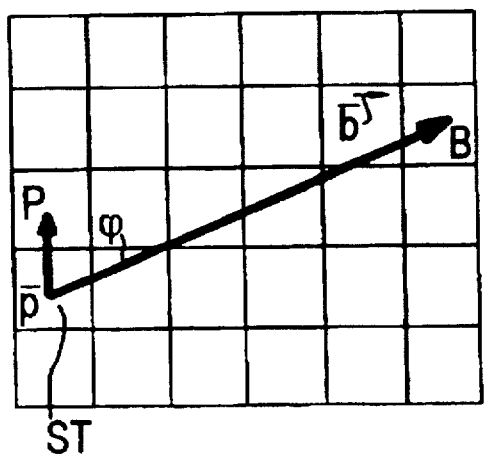
FIG. 11 illustrates the calculation of the bonus value for the task defined by the user.

FIG. 11 shows for example how a cost/benefit examination can be conducted for a task defined by the user. The unit is located, for example, in the cell ST. For example, B is the destination which has been prescribed by the user, and P the next partial goal within the scope of route planning. The vectors $\vec{b}$ and $\vec{p}$ in this case specify the appropriate directions to the respective points B and P.

In order to be able to specify a benefit, the deviation of every path segment from a direction to the destination is evaluated for the task defined by the user, for example. The partial benefit for the respective change in travel direction is therefore a function of the angle defined by the two vectors. For example, the smaller this angle, the greater the benefits with respect to the task defined by the user. The resultant evaluation factor, that is to say the partial benefit, is at a maximum, for example, when the unit is always moving in the direction of the destination, that is to say in the $\vec{b}$ direction.

$$B_u = \sum_{i=0}^{N-1} N_{ui}$$

$$N_{ui}(p) = \cos(\phi) = \frac{\vec{b} \cdot \vec{p}}{|\vec{b}| \cdot |\vec{p}|}$$

In order to be able to evaluate the positional uncertainty, it is necessary to determine the uncertainty at the end of a path of length N, that is to say the planning horizon. In order to be able to fulfill the partial tasks of the unit, this positional uncertainty must be as small as possible at the end of the path. Although it may increase along the path, it should not overshoot a specific value. The evaluation function of the configuration uncertainty is, for example, a function only of the uncertainty at the end of a path of length N. This is to be small at the end of a path; along the path, the uncertainty may also be larger. The trace sp(Q) of the uncertainty covariance matrix Q is defined as the evaluation criterion.

$$Q(k) = \begin{bmatrix} \sigma_x^2 & \sigma_x\sigma_y & \sigma_x\sigma_\theta \\ \sigma_x\sigma_y & \sigma_y^2 & \sigma_y\sigma_\theta \\ \sigma_x\sigma_\theta & \sigma_y\sigma_\theta & \sigma_\theta^2 \end{bmatrix}$$

$$B_c = \frac{1}{sp(Q)}$$

$$B_c = \frac{1}{\sigma_x^2 + \sigma_y^2 + \sigma_\theta^2}$$

The higher the configuration uncertainty, the smaller, for example, is the benefit at the end of this path. For example, the benefit is not added on here. Only the estimated uncertainty at the end of the path is used for the purpose of evaluation.

FIG. 12 shows two evaluation functions which are used within the scope of the partial task of forming the map. In the task of building up landmarks, benefits can be collected along the path, that is to say from grid cell to grid cell, when searching for the path (as in the case of the task defined by the user). In this case, the benefit per grid cell can be composed as follows:

$$N_{fi} = (V_i + T_i + O_i) * C_i$$

$$B_f = \sum_{i=0}^{N-1} N_{fi}$$

For example, the benefit of a cell which has just been visited depends on how frequently this cell has already been crossed by the unit. The dependence can, for example, be as is specified in FIG. 12b. The number of passing operations is denoted there by $Z_u$. For example, the number $Z_u$ is increased by 1 for each crossing of a cell. The more frequently this cell has already been crossed, the lower is its benefit in building up the map, since any possible landmark present must already have been found. Using this function, which is represented in FIG. 12b and denoted by $V_i$, the autonomous mobile unit is driven into an unknown area, since only there can a benefit be acquired. This favors the finding of unknown landmarks in the new area. It takes the following form, for example:

$$V_i = e^{\frac{Z_u}{V_c}}$$

A further factor which should be taken into account in the task of forming the map is the unconfirmed landmarks. FIG. 12a indicates a function $T_i$ which describes the benefit as a function of a number of visible provisional landmarks. The function states, for example, that the benefits of a cell under search becomes higher the more unconfirmed landmarks can be seen from this cell. It is therefore assumed that the unit has already been in this area previously and has stored the data of provisional landmarks in its memory. However, since the landmarks have not yet been surveyed frequently enough, they have not yet been confirmed. When building up the landmarks, it is therefore of great benefit to drive into the visibility regions of the provisional landmarks, since there is a high probability in these areas of finding new confirmed landmarks which can subsequently be used to perform a positional correction again. The unit therefore collects large benefits when it drives through visibility regions of provisional landmarks. In qualitative terms, $T_i$ has the following form, for example:

$$T_i = 1 - e^{\frac{z_{i u}}{T_c}}$$

The functions which are represented in FIGS. 12a and 12b tell only the qualitative relationship, and are not intended to be absolute limitations on the invention. They represent the current state of development. Furthermore, preferred orientations can be stored for all cells in the visibility region of provisional landmarks. In route planning and route searching, account is taken of the correspondence between the current orientation and the preferred orientation, which is stored in the cell. If the orientation of the unit corresponds to the preferred direction, there is, for example, an additional benefit. If the number of corresponding directions is greater, the benefit which is thereby achieved also becomes greater, for example. Furthermore, it can be advantageous to determine a partial benefit in the form in which the number of already confirmed landmarks which are visible per cell is used as a weighting factor. Specifically, it is possible to proceed in this case such that landmarks already confirmed restrict the benefit for building up the map, since a plurality of confirmed landmarks which can be seen from a cell suffice to render the position of the autonomous mobile unit capable of being exactly determined. It would therefore not be necessary to build up further landmarks and thus waste computing time and storage space.

The following evaluation formula is recommended for the individual partial benefits of a route in the control unit:

$$R_i = \alpha_u * B_{ui} + \alpha_f * B_{fi} + \alpha_c * (1 - B_{ci})$$

$$R_i = (\alpha_u * B_{ui} + \alpha_f * B_{fi}) * B_{ci}$$

For example, the map can be evaluated overall by evaluating the overlapping of landmarks in visibility regions. It is possible, for example, to proceed as follows in this case: regions in which only one landmark can be seen should be more closely investigated in order to find further landmarks. Regions from which two landmarks can be seen have been sufficiently explored, and it is not necessary to explore further landmarks. Such regions from which it has not yet been possible to detect a landmark, must be searched specifically for any natural landmarks which may be present. For example, given surroundings are not completely opened up until it is possible to see a plurality of landmarks from each point. Completeness is not, however, mandatory. An autonomous mobile unit can certainly orientate itself within the scope of the start/goal direction in surroundings which are only known around the route. In order to spare the resources of the autonomous mobile unit, it is possible to evaluate overlaps between the landmark visibility regions.

FIG. 13 shows the route of an autonomous mobile unit from a starting point ST to a goal 2. In detail, various landmarks LM are contained in the surroundings, and the route FW passes by them. Also represented are the visibility regions VIS of various characteristic points and landmarks. It is to be borne in mind when viewing FIG. 13 that the surroundings of the unit are not known at the start of its route at the starting point ST. In order to fulfill the most varied partial tasks, grid cells are built up along the route and in a local area and are assigned preferred travel directions. The partial tasks are evaluated in accordance with different criteria and weighted with the aid of priorities. For example it can be seen that at a location KO the autonomous mobile unit has driven in the direction of a landmark in order to reduce the positional uncertainty. At a second location ST, it can be seen that fewer landmarks are present there, and that therefore the unit drove in the direction of various landmarks in order to reduce the positional uncertainty or to add new landmarks to the map.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for orientation, route planning and control of an autonomous mobile unit, comprising the steps of:

in a first step the unit drawing up a map of its surroundings in a first routine to be evaluated by using an on-board sensor arrangement for surveying the surroundings and, starting from a position of the unit, evaluating features of the surroundings which become known to the unit and entering the features into the map of the surroundings in a form of landmarks;

in a second step, in surroundings the unit does not know completely, the unit moves in a second routine to be evaluated from a starting point via at least one partial goal in a direction of a destination and in so doing makes use of at least the map of the surroundings and the sensor arrangement for orientation, route planning and control;

in a third step in a third routine to be evaluated the unit monitors errors, due to measuring inaccuracy of the sensor arrangement, in determination of a position of the unit, as positional inaccuracy, and reduces the errors by approaching a landmark;

in a fourth step at least one bonus value and/or penalty value is respectively allotted for each routine of the first, second and third routines to be carried out, as a function of contribution which the at least one bonus value and/or penalty value make in order to enable the unit to reach its destination whereby at least one destination direction deviation and/or a great positioning error and/or a slight plurality of landmarks are poorly evaluated in the map;

in a fifth step as a consequence of a common evaluation of respective bonus values and/or penalty values in a control unit of the unit at least the routine to be carried out is determined, and a route of the unit is planned and controlled.

2. The method as claimed in claim 1, wherein at least for one routine to be evaluated of the first, second and third routines a weighting factor is obtained by adding up associated bonus values and/or penalty values and multiplying by a necessity value currently valid for the at least one routine.

3. The method as claimed in claim 1, wherein at least for each routine to be evaluated of the first, second and third routines a threshold value is fixed for the bonus values and/or penalty values upon overshooting or undershooting of the threshold value which the at least one routine is carried out in a prioritized fashion.

19

4. The method as claimed in claim 1, wherein in order to reduce positional uncertainty a landmark is deliberately approached and surveyed, the unit knowing its location in the surroundings with great accuracy.

5. The method as claimed in claim 1, wherein at least one penalty value is a function of a path distance the unit must cover to perform a routine to be evaluated.

6. The method as claimed in claim 1 wherein at least the bonus value for the second routine is a function of an angle which is formed by a selected travel direction with a start/destination axis.

7. The method as claimed in claim 3, wherein, referred to elongated landmarks, at least the bonus value for the third routine is a function of a magnitude of a segment projected on to a normal ($p_r$) of the landmark, which is produced by projecting a positional uncertainty area around a site of the unit.

8. The method as claimed in claim 1, wherein a landmark whose position in the surroundings of the unit is known only very inaccurately is deliberately approached and surveyed.

9. A method for orientation, route planning and control of an autonomous mobile unit, comprising the steps of:

in a first step the unit drawing up a map of its surroundings in a first routine to be evaluated by using an on-board sensor arrangement for surveying the surroundings and, starting from a position of the unit, evaluating features of the surroundings which become known to the unit and entering the features into the map of the surroundings in a form of landmarks, the autonomous unit drawing up a cellularly structured map of surroundings of the unit in the first routine, the landmarks being distinguished as confirmed and unconfirmed landmarks as a function of the number of measuring operations affecting the landmarks and/or of the number of the locations from which the landmarks were surveyed, and at least the following information being stored per cell of the map of the surroundings:

i) seen from the cell, is a landmark located in a measuring range of a distance meter on-board the unit;

ii) if i) is answered affirmatively, for confirmed landmarks: a direction of distance measurement along a direction between the affected cell and at least one confirmed landmark;

for unconfirmed landmarks: the travel direction along at least one unconfirmed landmark;

iii) how often has the affected cell already been crossed;

in a second step, in surrounding the unit does not know completely, the unit moves in a second routine to be evaluated from a starting point via at least one partial goal in a direction of a destination and in so doing makes use of at least the map of the surroundings and the sensor arrangement for orientation, route planning and control, in a third step in a third routine to be evaluated the unit monitors errors, due to measuring inaccuracy of the sensor arrangement, in determination of a position of the unit, as positional inaccuracy:

in a fourth step at least one bonus value and/or penalty value is respectively allotted for each routine of the first, second and third routines to be carried out, as a function of contribution which the at least one bonus value and/or penalty value make in order to enable the unit to reach its destination whereby at least one destination direction deviation and/or a great positioning error and/or a slight plurality of landmarks are poorly evaluated in the map, a planning horizon being prescribed as a number of cells to be driven through in succession possible travel directions of a unit being discretized such that, starting from a given cell position of the unit, each immediately adjacent cell being reached only in respectively one discrete travel direction, and for the planning horizon all routes which can be combined with using the discrete travel directions, being evaluated by adding up respectively occurring bonus values and/or penalty values in the control unit of the unit and that route being traveled which achieves a highest bonus value or lowest penalty value; and in a fifth step as a consequence of a common evaluation of respective bonus values and/or penalty values in a control unit of the unit at least the routine to be carried out is determined, and a route of the unit is planned and controlled.

10. The method as claimed in claim 9, wherein the degree-of-occupancy values, which are incremented per cell, are stored as a measure of the probability of occurrence of an obstacle.

11. The method as claimed in claim 9, wherein the cells are square, thereby establishing eight travel directions.

12. The method as claimed in claim 9, wherein the cells are hexagonal, thereby establishing six travel directions.

13. The method as claimed in claim 9, wherein the combined routes are evaluated in a configuration space whose space axes are bounded by the planning horizon in two axial directions, and the number of discrete travel directions is bounded in a third travel direction, common information from information stored in the cells being stored in the direction of the travel direction axis for all respectively superimposed cells.

14. The method as claimed in claim 13, wherein at least a route cell sequence which achieves a highest bonus value and/or lowest penalty value is stored per cell of the configuration space.

15. The method as claimed in claim 9, wherein a resultant benefit for a route combination is determined as:

$$R_N = \alpha_u * B_u + \alpha_c * B_c + \alpha_f * B_f$$

wherein

B is a partial benefit, $\alpha$ is a weighting factors, index u is task of driving to a goals, index c is task of monitoring positional uncertainty, index f is task of drawing up map, individual partial benefits being yielded as $$B_M = \sum_{i=0}^{N-1} N_{ui}$$

wherein $N_{ui}(p) = \cos(\phi)$ as partial benefit for the route from one cell to the next cell with partial goal P and $\phi$ as an angle between a discrete travel direction and a start/goal direction $$B_c = \frac{1}{\sigma_x^2 + \sigma_y^2 + \sigma_\phi^2}$$

σ specifying positional uncertainty in the x-direction, σ positional uncertainty in the y-direction and σ positional uncertainty in the φ-direction of rotational orientation of the unit $$B_f = \sum_{i=0}^{N-1} N_{fi}$$

wherein $$N_{fi} = (V_i + T_i + O_i) * C_i$$

and $V_i$ as functional value of a function which, depending on a quantity of the crossing operations in a cell, supplies a real number which continually decreases with increasing quantity, $T_i$ as a functional value of a function which, depending on a quantity of the unconfirmed landmarks which are seen from a cell, supplies a real number which continually increases with increasing quantity, and $O_i$ as a functional value of a function which, depending on correspondence between actual travel direction and a travel direction stored for the cell, supplies a real number which continually increases with a travel direction stored for the cell, and $C_i$ as a functional value of a function which, depending on a quantity of the confirmed landmarks which are seen from a cell, delivers a continually decreasing real number with increasing quantity.

16. The method as claimed in claim 15, wherein the following functions hold:

$$V_i = e^{-\frac{Z_u}{5}}$$

with $Z_u$ as a quantity of crossings of the cell considered $$T_i = 1 - e^{-\frac{Z_{Lu}}{3}}$$

with $Z_{Lu}$ as a quantity of visible unconfirmed landmarks $$O_i = 1 - e^{-\frac{Z_F}{3}}$$

with $Z_F$ as a quantity of stored travel directions corresponding to current travel direction of a unit $$C_i = e^{-\frac{Z_{Lb}}{2}}$$

with $Z_{Lb}$ as a quantity of visible confirmed landmarks.

17. The method as claimed in claim 9, wherein a resultant benefit for an individual cell is calculated as:

$$R_i = \alpha_u * B_{ui} + \alpha_f * B_{fi} + \alpha_c * (1 - B_{ci}).$$

18. The method as claimed in claim 9, wherein a resultant benefit for an individual cell is calculated as:

$$R_i = (\alpha_u * B_{ui} + \alpha_f * B_{fi}) * B_{ci}.$$

* * * * *